Patented Feb. 20, 1951

2,542,697

UNITED STATES PATENT OFFICE 2,542,697

PRODUCTION OF NONIONIC DETERGENTS FROM OXIDIZED WAX AND OLEFIN OXIDE

John A. Nevison, Media, and William K. Griesinger, Drexel Hill, Pa., assignors to The Atlantic Refining Company, Philadelphia, Pa., a corporation of Pennsylvania No Drawing. Application December 16, 1949, Serial No. 133,478

5 Claims. (Cl. 260—410.6)

The present invention relates to the production of non-ionic detergents by subjecting hydrocarbon wax to oxidation, reacting the entire oxidation mixture including unoxidized wax with an olefin oxide to convert the oxidized wax components into water-soluble, oxygenated products, and separating these products from the unoxidized wax.

A further object of the invention is to increase the yield and enhance the detergent properties of the product by returning separated, unoxidized wax to the initial oxidation process.

A further object of the invention is to improve the detergent product by dissolution in an aromatic hydrocarbon solvent and separation of insoluble impurities.

In accordance with this invention, a hydrocarbon wax, preferably a paraffin wax melting between 45° F. and 150° F. is subjected to oxidation with air or other gaseous oxidizing medium in the presence of an oxidation catalyst at a temperature between 230° F. and 400° F., and preferably between 260° F. and 300° F. for sufficient time to convert a substantial proportion of the wax into oxygenated compounds such as carboxylic acids, esters, and aldehydes. The average carbon atom content of the wax preferably ranges between 15 and 30, and the carbon atom content of the oxygenated product is preferably of the order of 12 to 14. A charge wax of an average of 15 carbon atoms will give oxygenated products of about 10 carbon atoms, and a charge wax of 30 carbon atoms will give products of about 18 carbon atoms. The oxidation may be conducted at atmospheric or super-atmospheric pressures, using oxidation catalysts such as potassium permanganate, manganese stearate or naphthenate, cobalt stearate or naphthenate in small amounts, i. e., 0.1%–0.5% by weight, preferably in the presence of a small amount of a base, e. g., 0.1%–0.5% of sodium carbonate to reduce the formation of hydroxy acids. The oxidation period usually ranges from 10 to 30 hours depending upon the nature of the wax, the amount of air and the temperature employed. For example, using a 90° F. melting point paraffin wax, an oxidation period of 18 to 22 hours is preferred, the temperature being about 300° F., the catalyst 0.1% manganese naphthenate and 0.1% sodium carbonate, and the air rate about 3 cc. per minute per gram of wax charge. However, the air rate may be varied within the range of 1 to 6 cc. per minute, but a rate of 2 to 3 cc. per minute is preferred.

Upon completion of the oxidation step, the entire mixture of oxygenated wax components and unoxygenated wax, with or without removal of the oxidation catalyst, is heated to a temperature within the range of 350° F. to 450° F., and preferably 375° F. to 425° F. To the mixture is added a condensation catalyst, for example, 1% by weight of sodium glycerophosphate and 10% by weight of dry sodium hydroxide pellets based upon the total amount of oxidized wax acids present. The amount of sodium hydroxide may vary between 5% and 15%, and catalysts other than the specific combination above mentioned may be used. An olefin oxide, such as ethylene oxide, is then introduced into the heated mixture, and the condensation reaction proceeds. In order to obtain water-soluble products, ethylene oxide in the amount of 10 to 20 equivalents is admitted during the reaction period, which is usually of the order of 8 to 15 hours, a period of about 10 hours being average. The ethylene oxide equivalent is determined in the following manner.

A representative sample of the oxidized wax mixture is saponified with excess aqueous sodium hydroxide solution. The resulting aqueous solution of sodium salts of the oxidized wax acids is extracted with petroleum naphtha to remove unoxidized wax, and the aqueous solution is acidified with mineral acid to liberate the wax acids, the weight of which is noted. The wax acids are then titrated with alcoholic potassium hydroxide to the phenolphthalein endpoint and the saponification number thus obtained. From the saponification number, the molecular weight of the wax acids is calculated. From this data, the ethylene oxide equivalent is obtained from the following relationship:

$$\text{E. O. Equiv.} = \frac{(\text{Wt. of Oxid. Mix})(\%\ \text{Wax Acids}/100)(\text{Mol. Wt. of Eth. Oxide})}{(\text{Mol. Wt. of Wax Acids})}$$

Upon completion of the condensation reaction between the ethylene oxide and the oxygenated components of the wax, the entire mixture of water-soluble condensation product and unoxidized wax is permitted to stand, whereupon the catalyst settles as a separate phase and is removed. The mixture is then cooled and treated with several volumes of liquid paraffinic hydrocarbon such as pentane, hexane, petroleum ether, or petroleum naphtha boiling within the range of 100° F. to 400° F. Such treatment may be carried out by diluting or washing the reaction mixture with 3 or 4 volumes of liquid paraffinic hydrocarbon (100% by volume each based upon the volume of reaction mixture). As a result of this treatment, the unoxidized wax is dissolved and removed from the water-soluble, oxygenated condensation product. The solution of unoxidized wax may be distilled to recover the paraffinic hydrocarbon and the residue of unoxidized wax may be returned to the initial oxidation step, in admixture with fresh wax, for conversion into oxygenated wax. Residual paraffinic hydrocarbon may be removed from the water-soluble condensation product by vaporization at reduced pressure, preferably with moderate heating. In many cases, it has been found that the water-soluble oxygenated condensation product, upon standing for a period of time, will deposit a sediment which comprises primarily finely divided catalyst. To remove this material from the condensation product immediately following the condensation reaction and separation of unoxidized wax, the condensation product may be diluted with 2 to 4 volumes of an aromatic hydrocarbon solvent such as benzene, toluene, xylene, cumene, or the like, preferably boiling below 400° F. The condensation product is dissolved in the aromatic solvent, and the solid impurities, e. g., catalyst, may be settled out or removed by filtration. The aromatic solvent may be recovered from the purified product by vaporization, preferably under reduced pressure.

The non-ionic detergents produced from a once-through operation are usually amber to reddish colored liquids which possess pleasant ester-like odor, while those produced by repeated recycling of separated, unoxidized wax to the initial oxidation step are brown, viscous to solid materials. These non-ionic detergents may be admixed with various amounts of inorganic salts such as alkali metal sulfates, pyrophosphates, polyphosphates (particularly tripolyphosphates), carbonates, or mixtures of two or more thereof, to obtain improved detergency or synergistic properties. Also, the detergents produced in accordance with this invention may be admixed with cationic or anionic detergents or soaps including alkyl sulfates or sulfated higher alcohols, aryl sulfonates, alkyl aryl sulfonates especially those containing 12 to 15 carbon atoms in the alkyl group, alkyl phenol sulfonates, alkyl naphthalene sulfonates, alkanolamine soaps of sulfonic acids and of fatty acids, alkali metal soaps of fatty acids, and the like.

The present invention may be further illustrated by the following examples, which, however, are not to be construed as limiting the scope thereof.

(1) A 90° F. melting point paraffin wax was oxidized at 300° F. for 16 hours using a catalyst consisting of 0.1% manganese naphthenate and 0.1% sodium carbonate, with bubbling air through the mixture at a rate of 3 cc. per gram of wax per minute. Following the oxidation step, the mixture was divided in a plurality of samples, each being heated to 400° F. and ethylene oxide introduced in a different amount for a period of 10 hours, employing in each case a condensation catalyst of 1% sodium glycerophosphate and 10% caustic soda. Each of the condensation reaction mixtures, i. e., water-soluble product and unreacted wax, was washed with 4 volumes of 86° paraffinic petroleum naphtha to remove unreacted wax. The resulting non-ionic detergents were each mixed with sodium sulfate to give mixtures of 40% detergent—60% sodium sulfate. These mixtures were tested for cotton detergency by a standard Launderometer test at concentrations of 0.3% and 0.5% in tap water. The results are shown in the following table.

| Carbon atom content of wax acids (av.) | Eth. Oxide Equival. | Detergency | |
|---|---|---|---|
| | | 0.3% conc. | 0.5% conc. |
| 16 | 10 | 15 | 49 |
| 16 | 12.6 | 24 | 32 |
| 16 | 15.6 | 50 | 64 |
| 16 | 18.4 | 58 | 69 |
| 16 | 21.7 | 47 | 61 |

(2) A paraffin wax having a melting point of 90° F., a boiling range of 360° F. to 491° F., and a molecular weight of 274 was oxidized with air in the presence of a manganese naphthenate-sodium carbonate catalyst, the resulting mixture of oxygenated and unoxidized wax was condensed with ethylene oxide in the presence of sodium glycerophosphate - caustic soda catalyst, the water-soluble oxygenated condensation product was washed with pentane to remove unoxidized wax, and the condensation product in the crude state, as well as after purification with benzene, was tested for detergency in concentrations of 0.3% and 0.5% in a standard Launderometer test. After removal of pentane from the unoxidized wax, such wax was recycled with fresh wax to the oxidation step. This operation was repeated through 4 runs, the results of which are tabulated below.

*Oxidation step*

| Run | Charge, g. | | Oxid. Temp., °F. | Hours | Air, cc./g./min. | Oxidation Products | | | |
|---|---|---|---|---|---|---|---|---|---|
| | Fresh | Recycle | | | | Wt. g. | Acid No. | Sap. No. | Wt. Percent Wax Acids |
| 1 | 375 | 0 | 320 | 22 | 3.2 | 362 | 99 | 202 | 40 |
| 2 | 157 | 218 | 320 | 22 | 3.2 | 364 | 14 | 92 | 20 |
| 3 | 85 | 290 | 320 | 22 | 3.2 | 363 | 34 | 92 | 20 |
| 4 | 55 | 320 | 320 | 22 | 3.2 | 354 | 20 | 101 | 20 |

*Condensation step*

| Run | Eth. Oxide added | | Temp., °F. | Catalyst, Percent NGP, Percent NaOH | Recov. Wax | | | Non-ionic Detergent | | | |
|---|---|---|---|---|---|---|---|---|---|---|---|
| | g. | Eq. | | | g. | Acid No. | Sap. No. | Crude, g. | Refined | | |
| | | | | | | | | | g. | Acid No. | Sap. No. |
| 1 | 331 | 11.9 | 400 | ½ | 230 | 0 | 70 | 475 | 418 | 1.3 | 61 |
| 2 | 166 | 11.8 | 400 | ¼ | 306 | 0 | 30 | 250 | 216 | 0 | 36 |
| 3 | 164 | 11.8 | 400 | ½ | 338 | 0 | 37 | 200 | 183 | 0 | 46 |
| 4 | 163 | 12.0 | 400 | ¼ | 292 | 0 | 20 | 235 | 217 | 0 | 38 |

Non-ionic detergent

| Run | Detergency | | | | Percent recovered as refined non-ionic | Parts refined non-ionic/100 parts wax | Parts refined non-ionic/100 parts fresh wax |
|---|---|---|---|---|---|---|---|
| | Crude | | Refined | | | | |
| | 0.3% | 0.5% | 0.3% | 0.5% | | | |
| 1 | 34 | 35 | 34 | 35 | 88 | 112 | 112 |
| 2 | 41 | 60 | 43 | 64 | 86 | 58 | 138 |
| 3 | 58 | 70 | 61 | 65 | 91 | 49 | 216 |
| 4 | 70 | 75 | 63 | 73 | 92 | 58 | 394 |

From the description and data given herein, it will be apparent that a simple and economic method is provided for producing non-ionic detergents by the direct condensation of an olefin oxide with the oxygenated components of hydrocarbon wax, and the direct recovery of the condensation product from the unoxidized wax. Such method avoids the difficulties and expense involved in prior art methods wherein the oxygenated wax components were first recovered by saponification and acidification, and thereafter, with or without fractional distillation, condensed with olefin oxides.

We claim:

1. A method of producing a non-ionic detergent, which comprises reacting a mixture containing oxygenated and unoxygenated hydrocarbon wax with sufficient ethylene oxide such that the oxygenated reaction product is water-soluble, treating the reaction mixture containing the oxygenated, water-soluble product and unoxygenated hydrocarbon wax with sufficient liquid paraffinic hydrocarbon to dissolve the unoxygenated hydrocarbon wax but not the oxygenated, water-soluble product, and separating the solution of liquid paraffinic hydrocarbon and unoxygenated wax from the oxygenated, water-soluble product.

2. A method of producing a non-ionic detergent, which comprises reacting a mixture containing oxygenated and unoxygenated hydrocarbon wax at 375° F. to 425° F. with sufficient ethylene oxide such that the oxygenated reaction product is water-soluble, treating the reaction mixture containing the oxygenated, water-soluble product and unoxygenated hydrocarbon wax with sufficient liquid paraffinic hydrocarbon to dissolve the unoxygenated hydrocarbon wax but not the oxygenated, water-soluble product, and separating the solution of liquid paraffinic hydrocarbon and unoxygenated wax from the oxygenated, water-soluble product.

3. A method of producing a non-ionic detergent, which comprises reacting a mixture containing oxygenated and unoxygenated hydrocarbon wax with 10 to 20 equivalents of ethylene oxide at 375° F. to 425° F., treating the reaction mixture containing the oxygenated water-soluble product and unoxygenated hydrocarbon wax with sufficient liquid paraffinic hydrocarbon boiling between 100° F. and 400° F. to dissolve the unoxygenated hydrocarbon wax but not the oxygenated, water-soluble product, and separating the liquid paraffinic hydrocarbon and unoxygenated wax from the oxygenated, water-soluble product.

4. A method of producing a non-ionic detergent, which comprises reacting a mixture containing oxygenated and unoxygenated hydrocarbon wax with 10 to 15 equivalents of ethylene oxide at 375° F. to 425° F., treating the reaction mixture containing the oxygenated, water-soluble product and unoxygenated hydrocarbon wax with sufficient liquid paraffinic hydrocarbon boiling between 100° F. and 400° F. to dissolve the unoxygenated hydrocarbon wax but not the oxygenated, water-soluble product, separating the liquid paraffinic hydrocarbon and unoxygenated wax from the oxygenated, water-soluble product, dissolving the oxygenated, water-soluble product in a liquid aromatic hydrocarbon solvent, separating the resultant solution from insoluble impurities, and removing the aromatic hydrocarbon solvent from the purified product.

5. A method according to claim 4 in which the liquid paraffinic hydrocarbon is pentane and the aromatic hydrocarbon solvent is benzene.

JOHN A. NEVISON.
WILLIAM K. GRIESINGER.

REFERENCES CITED

The following references are of record in the file of this patent:

UNITED STATES PATENTS

| Number | Name | Date |
|---|---|---|
| 2,233,382 | De Groote | Feb. 25, 1941 |